ECHO-TYPE EQUALIZER WHICH DIFFERENTIATES ECHO SIGNALS

Filed April 22, 1963 2 Sheets-Sheet 1

ECHO-TYPE EQUALIZER WHICH DIFFERENTIATES ECHO SIGNALS

Filed April 22, 1963

3,290,607

ECHO-TYPE EQUALIZER WHICH DIFFERENTIATES ECHO SIGNALS

Koichi Endo, Tokyo, and Masao Kawashima, Yokohama-shi, Japan, assignors to Fujitsu Limited, Kawasaki, Japan, a corporation of Japan Filed Apr. 22, 1963, Ser. No. 274,764
6 Claims. (Cl. 328—162)

Our invention relates to equalizers, particularly for restoring the wave shape of broad-band wave-forms, such as television video signals or pulse signals, which have been distorted by transmission.

Broad-band wave-form signals such as of television video signals or pulse signals tend to become distorted by transmission lines which fail to exhibit flat frequency characteristics with regard to amplitude or group delay time. Known amplitude and group delay equalizers constructed with passive networks are effective for eliminating such amplitude distortion and group delay distortion. However, amplitude equalizers usually produce group delay distortion while group delay equalizers, unless their elements are lossless, produce amplitude distortion, thus rendering it difficult to completely suppress both types of distortion. Moreover, transmission lines frequently cause wave distortions unrelated to amplitude and group delay which cannot be equalized entirely by the above-mentioned conventional equalizers.

Known for compensating such distortions are time equalizers or echo equalizers. In such devices, a wave-form to be equalized is applied to the input end of a delay circuit whose other end constitutes a non-reflective terminal resistance. A main signal is extracted from one tap of the delay circuit while echo signals are extracted at integral multiples of the time $T_0$ before and after the main signal. The echo signals are adjusted, combined with each other and then with the main signal, to produce a comparatively equalized output. However, such equalizers have outputs requiring still further correction.

It is an object of our invention to provide an echo-type equalizer which serves to reconstitute or equalize transmitted signals in a more reliable manner, which will avoid the above-mentioned deficiencies of known echo equalizers.

To this end, and according to a feature of our invention, in an echo equalizer of the above type, we differentiate the combined signals from the adjusted echo taps before combining them with the output at the main tap.

The invention, its other objects and advantages, will be explained more fully in the following detailed description of an echo equalizer when read in the light of the accompanying drawings, wherein.

Figures 5A, 5B, 6A, 6B:
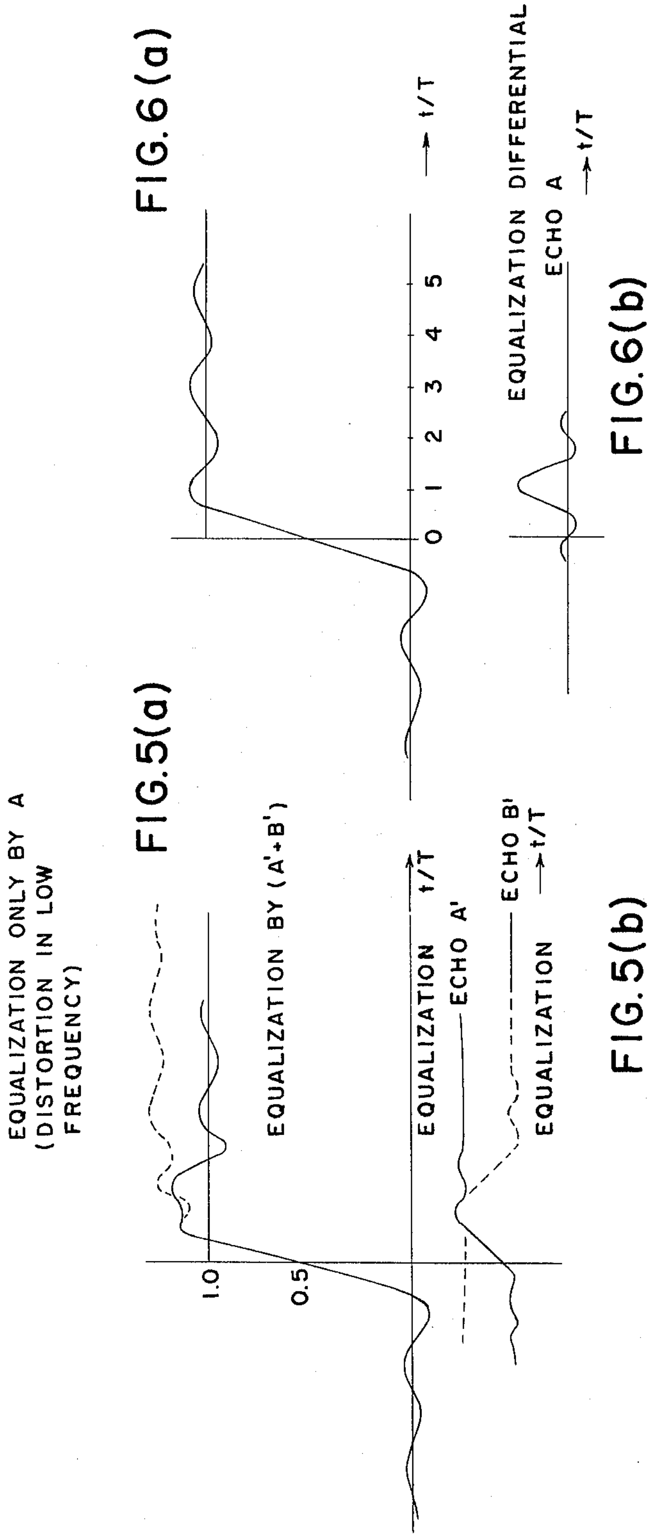

FIGS. 5*a* and 5*b* are time-voltage graphs of time-voltage curves illustrating the equalization corresponding to known echo-type equalizers; and FIGS. 6*a* and 6*b* are time-voltage graphs illustrating the effects of wave-forms in the equalizer according to the invention.

Figures 1, 2, 3, 4:
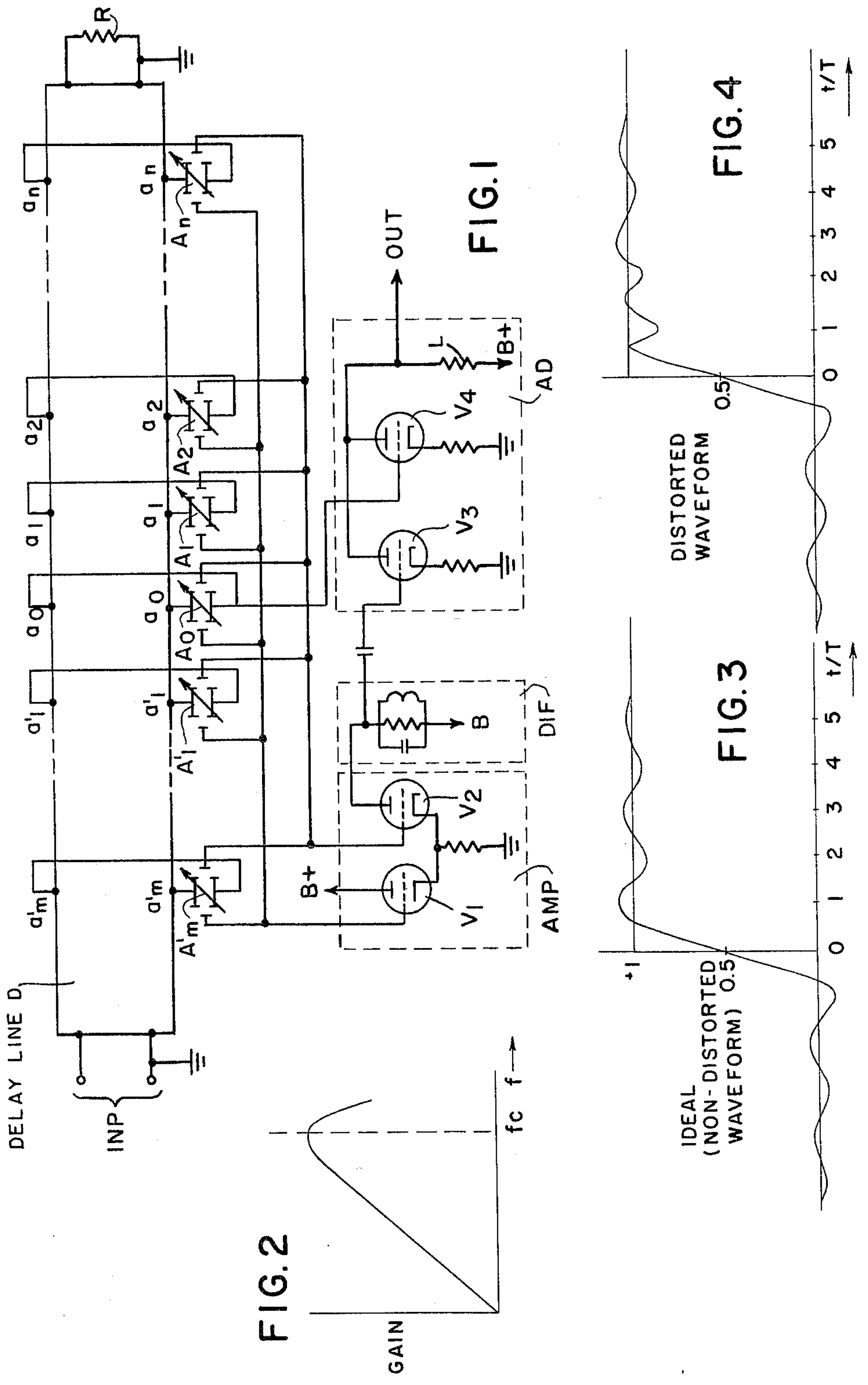
FIG. 1 is a schematic representation of an echo equalizer embodying features of the present invention.
FIG. 2 is a gain-frequency graph showing the response of the differentiating circuit in FIG. 1.
FIG. 3 is a time-voltage graph of an ideal distortionless wave-form.
FIG. 4 is a time-voltage graph corresponding to that of FIG. 3, but showing a distorted wave-form.

In FIG. 1 a wave-form to be equalized (from a transmission line or the like) is applied to input terminals Inp of a delay line D whose other end is connected to a non-reflective terminal resistance R. The delay line is comprised of a plurality of bridge capacitors. A main signal is extracted from the delay line at the terminals $a_0$ and directed to an output Out by means of an amplifier AD. A number of echo signals are extracted from the delay line D at the point $a_0$ and other points in the line D which are placed before and after the main signal taps $a_0$ at intervals of $T_0$, the other points being identified as $a'_m \dots a'_1$ before the taps $a_0$, and $a_1 \dots a_n$ after $a_0$. Extracting these respective signals are a plurality of elements $A'_m \dots A'_1$, $A_0$, $A_1$, $\dots A_n$, each forming respective interlocked differential capacitors of which one pair of terminals is connected parallel to the bridge circuit. The differential capacitors are connected as shown so that their respective capacitances measured from the side of the delay circuit remain constant even though they are varied, but that their output sides vary as their plates are moved.

The opposite sides of the outputs in the adjustment circuits $A'$, $A_1(i=m, \dots 2,1; p=0,1, \dots n)$ are combined two groups each of which is applied to the respective grid inputs of respective vacuum tubes V1 and V2, forming a differential amplifier AMP. The vacuum tubes V1, V2 possess respective cathodes which are connected to ground by a common resistor. The plate of vacuum tube V1 is connected to a power supply source B+. The load for the amplifier AMP constitutes a differentiating or LCR circiut DIF tuned to a frequency $fc$.

The differentiating circuit DIF constitutes an LCR tuning circuit having a tuning frequency $fc$ near the cut-off point of the system and an arbitrary Q such that the slope of the amplitude-frequency characteristic is almost linear in the lower side band of the tuning frequency. The response of the differentiating circuit DIF is shown in FIG. 2. The output of the differentiating circuit passes by means of a coupling capacitor to the summing amplifier AD comprised of vacuum tubes V3 and V4 and forming a linear sum of the differentiated echo signals and the main signals. The equalized signal is extracted from the common load L of the summing amplifier AD.

An ideal non-distorted wave-form which may have been transmitted at a transmiter is illustrated in FIG. 3, showing voltage relative to time or $V/V_0$ relative to $t/T$. A transmission line will distort such a wave-form to the shape shown in FIG. 4. When this is applied to the inputs of delay line D it is delayed and extracted at the terminals $a_0$ and applied to the grid of tube V4. Remaining echoes which are delayed respectively for less and longer times than the main signal are tapped off at respective terminals $a'_i$ and $a_p$ and adjusted with capacitor adjusters $A'_i$ and $A_p$ constituting differential condensers having two outputs each. These two outputs of the differential condensers are combined or added respectively into two groups which are supplied to the grids of tubes V1 and V2 forming the differential amplifier AMP. The output of the differential amplifier AMP is shown in the voltage-time graph as curve A' of FIG. 5*b*.

This is applied to the load DIF of the amplifier, an LCR tuning circuit or differentiating circuit having a tuning frequency near the cut-off point of the system and a Q such that the slope of the amplitude-frequency characteristic is almost linear in the lower-side band of the tuning frequency. The output of the differentiated circuit of the echo signal is shown in the voltage-time graph of FIG. 6*b*. The signal passes to the summing amplifier AD to produce an output corresponding to FIG. 6*a*. The output is taken across the common load L of amplifier AD.

The above may be better understood from a consideration of the following theoretical matters.

In the delay line, the main signal is extracted from the taps $a_0$; the signals advancing before the main signal and placed at time intervals $T_0$ are extracted through the adjusting elements $A'_1$ to $A'_m$ at the respective voltages $K'_1e^{-j\omega T_0}$ to $K'_me^{-jm\omega T_0}$. The signals lagging behind the main signal and placed at intervals of $T_0$ are extracted through the adjusting elements $A_1$ to $A_n$ at the respective voltages $K_1e^{j\omega T_0}$ to $K_1e^{jn\omega T_0}$ ($m=M$ and $n=N$; $\omega$=the greek lower case omega). In known devices these corrective echo wave-forms are extracted and added directly to the main signal at the auxiliary amplifier AMP, equalizing it, and are picked up at the output terminal Out. This corresponds to a device such as that shown in FIG. 1, only substituting a resistive load for circuit DIF.

In such known equalizers the transmission characteristices in the range between the input and output terminals can be given mathematically as $$R(\theta)=1+\sum_{n=1}^{N}k_n\epsilon^{jn\omega T_0}+\sum_{m=1}^{M}k'm\epsilon^{-jm\omega T_0}$$

Hence the amplitude characteristics and the group delay characteristics ($d/dw$ of the phase characteristics) of the time equalizer are respectively expressed as $$A(\omega)=1+\sum_{m=1}^{M}(km+k'm)\cos(m\omega T_0)+\sum_{n=M+1}^{N}kn\cos(n\omega T_0)$$

$$D(\omega)=\sum_{m=1}^{M}(km-k'm)mT_0\cos(m\omega T_0)+\sum_{n=M+1}^{N}kn\cos(n\omega T_0)$$

If $M=N$, then $$A(\omega)=1+\sum_{m=1}^{M}(km+k'm)\cos(m\omega T_0)$$

$$D(\omega)=\sum_{m=1}^{M}mT_0(km-k'm)\cos(m\omega T_0)$$

Thus, this time equalizer can be characterized as the cosine type. Each term forming the summation in $A(\omega)$ is a cos-term with a coefficient of $(km+k'm)$. Each $\cos(m\omega T_0)$ term of the above equation is weighted by $(km+k'm)$ because the function cos X where $X=m\omega T_0$ exhibits a maximum value at $X=0$. Thus, in the case of the cosine-type equalization, unnecessary or excessive equalization occurs in the vicinity of a direct current component (hereinafter referred to as the D.C. component) where $\omega=0$, in all terms. When humps are equalized at a number of points on the frequency scale, such unnecessary equalizations are accumulated in the vicinity of the D.C. component. To counterbalance this, further correction is required, which must also be protected from excessive equalization constituting distortion. As a result, an extremely complicated repetitive adjustment of the equalizer is necessary.

FIG. 3 illustrates an example of ideal distortionless step waveform expressed mathematically as $$S(t)=1/2+\frac{1}{\pi}\int_0^{\frac{\pi}{T_0}}\frac{\sin\omega t}{\omega}d\omega$$

A transmission line distorts this waveform to a form such as shown in FIG. 4. The distortion is at its maximum at the time point $$1\left(\frac{t}{T_0}\right)$$

where it requires correction. FIG. 5*a* shows the corresponding equalized waveforms. The upper waveform represented in a dotted line is the one equalized by the echo A' shown in FIG. 5*b*. The equalization in this case is applied to a large extent to the low-frequency components of the wave, with the result that while equalization is effected at the desired time points, unwanted distortion occurs at the other later time domain. When the composite wave of the echos A' and B', FIG. 5*b*, is used for correction, the equalization of the low-frequency components can be reduced considerably. However, wave correction at the desired point is still incomplete, as shown by the lower waveform in FIG. 5*a*, because of the broadness of the composite wave.

By virtue of differentiator DIF, the present invention eliminates the above drawback to the conventional cosine-type time equalizer while nevertheless achieving a simple and reliable time equalizer. Corrective echoes are added to the main signal after passing an auxiliary amplifier and a differential circuit. If the auxiliary amplifier is disregarded for simplicity of representation, the transmission characteristics of the equalizer in FIG. 1 between its input terminal (Inp) and output terminal (Out) are as follows, inasmuch as the differentiated output of each tap is added to the main signal:

$$R(\Theta)=1+j\omega\left[ko+\sum_{n=1}^{N}kn\,\epsilon^{jn\omega T_0}+\sum_{m=1}^{N}k'm\,\epsilon^{-jm\omega T_0}\right]$$

Hence the amplitude characteristics and the group delay characteristic ($d/d\omega$ of the phase characteristics) are respectively expressed as $$A'(\omega)=1-\omega\left[\sum_{m=1}^{M}(km-k'm)\sin(mT_0\omega)+\sum_{n=M+1}^{N}kn\sin(nT_0\omega)\right]$$

$$D'(\omega)=ko+\left[\sum_{m=1}^{M}(km+k'm)\cos(mT_0\omega)+\sum_{n=M+1}^{N}\cos(mT_0\omega)\right]+T_0\omega\left[\sum_{m=1}^{M}m(km+k'm)\sin(mT_0\omega)+\sum_{n=M+1}^{N}nkn\sin(nT_0\omega)\right]$$

Assuming that $M=N$, for simplicity of representation, then $$A'(\omega)=1-\omega\sum_{m=1}^{M}(km-k'm)\sin(mT_0\omega),\quad D'(\omega)=ko\sum_{m=1}^{M}(km+k'm)\cos(mT_0\omega)+T_0\omega\sum_{m=1}^{M}m(km+k'm)\sin(mT_0\omega)$$

Thus, in the frequency domain, a cosine term is included in the formulation of the group delay time but only sine terms are included in the equation showing amplitude characteristics which represent energy. In the group delay time, the sine series of the second groups of the terms in the equation, having the coefficient $\omega$ whose magnitude increases in proportion to frequency, is greater in the higher frequency range. Thus, in the long run, approximately constant equalization characteristics of sine type occur around $\omega\approx0$, namely in the lower frequency range. The above, in the frequency domain, means that unnecessary or excess equalization does not occur in and around the D.C. component. This will be further clarified by the following explanation of waveform equalization in the waveform domain.

FIG. 6*a* shows the waveform into which the distorted one in FIG. 4 is equalized, while FIG. 6*b* illustrates an associated corrective echo. Since this echo is differentiated, it is expressed as $$Sn'(t)=kn\frac{d}{dt}S(t-nT_0)=\frac{kn\sin\frac{\pi}{T_0}(t-nT_0)}{T_0\frac{\pi}{T_0}(t-nT_0)}$$

The width of the echo-waveform is narrow and the waveform possesses orthogonality at the sampling point. That is, judging from the above formation regarding the frequency domain, no unnecessary corrective echo-waveform in the time domain occurs in the vicinity of the D.C. component. As a result, only the portion of the distorted waveform requiring equalization is equalized.

We claim:

1. An echo equalizer comprising delay means having a main tap and a plurality of echo taps, respective adjustor means connected to each echo tap and having respective outputs, said adjustor means providing signals at their outputs, circuit means connected to the outputs of the adjustor means for adding their signals, and differentiating means connecting the output of said circuit means to said main tap for differentiating the echo signals and producing with the signal at the main tap an equalized output signal.

2. An echo equalizer comprising delay means having a main tap and a plurality of echo taps, respective adjustor means connected to each echo tap and having respective outputs, said adjustor means providing signals at their outputs, circuit means connected to the outputs of the adjustor means for adding their signals, and differentiating means connecting the output of said circuit means to said main tap for differentiating the echo signals and producing with the signal at the main tap an equalized output signal, said differentiating means including a tuning circuit.

3. An echo equalizer comprising delay means having a main tap and a plurality of echo taps, respective adjustor means connected to each echo tap and having respective outputs, said adjustor means providing signals at their outputs, circuit means connected to the outputs of the adjustor means for adding their signals, and differentiating means connecting the output of said circuit means to said main tap for differentiating the echo signals and producing with the signal at the main tap an equalized output signal, said differentiating means including a capacitor, an inductor and resistor in parallel connection.

4. An echo equalizer comprising delay means having a main tap and a plurality of echo taps, respective adjustor means connected to each echo tap and having respective outputs, said adjustor means providing signals at their outputs, circuit means connected to the outputs of the adjustor means for adding their signals, and differentiating means connecting the output of said circuit means to said main tap for differentiating the echo signals and producing with the signal at the main tap an equalized output signal, said differentiating means including a capacitor, an inductor and resistor in parallel connection, said circuit means including an amplifier, said differentiating means forming the load for said amplifier.

5. An echo equalizer comprising a delay line, a plurality of taps forming a main signal output at one location along the line and a plurality of echo signal outputs at earlier and later locations along the line, a resistor at the end of the line to absorb reflections, respective capacitor adjustor means connected to each of said outputs and having each a pair of output terminals, a differential amplifier having one input terminal connected to the first output terminal on each adjustor means and a second input terminal connected to the other output terminal of each adjustor means, a differentiating circuit forming a load for said differential amplifier, and amplifier means connecting the voltage of said differentiating circuit to the main output to form an equalized signal.

6. An echo equalizer comprising a delay line, a plurality of taps forming a main signal output at one location along the line and a plurality of echo signal outputs at earlier and later locations along the line, a resistor at the end of the line to absorb reflections, respective capacitor adjustor means connected to each of said outputs and having each a pair of output terminals, a differential amplifier having one input terminal connected to the first output terminal on each adjustor means and a second input terminal connected to the other output terminal of each adjustor means, a differentiating circuit forming a load for said differential amplifier, and amplifier means connecting the voltage of said differentiating circuit to the main output to form an equalized signal, said differentiating circuit comprising a tank circuit having a capacitor inductor and resistor.

References Cited by the Examiner

UNITED STATES PATENTS

| | | | |
|---|---|---|---|
| 2,790,956 | 4/1957 | Ketchledge | 333—29 |
| 2,975,371 | 3/1961 | Greanias | 333—39 |
| 2,976,516 | 3/1961 | Taber | 333—39 |
| 3,092,809 | 6/1963 | Merritt et al. | 333—29 |
| 3,181,089 | 4/1965 | Fujimoto | 333—29 |

ARTHUR GAUSS, *Primary Examiner.*

R. H. EPSTEIN, *Assistant Examiner.*